United States Patent

Inoue et al.

(10) Patent No.: US 6,892,110 B2
(45) Date of Patent: May 10, 2005

(54) NUMERICAL CONTROL UNIT (75) Inventors: Michiya Inoue, Hachioji (JP); Hajime Ishii, Hino (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/780,888

(22) Filed: Feb. 19, 2004

(65) Prior Publication Data

US 2004/0174130 A1 Sep. 9, 2004

(30) Foreign Application Priority Data

Feb. 21, 2003 (JP) ........................................ 2003-044200

(51) Int. Cl.$^7$ .............................................. G06F 19/00
(52) U.S. Cl. ........................................ 700/175; 702/34
(58) Field of Search ..................... 700/28–32, 174–175; 702/34, 41–43, 182–186; 318/563–566

(56) References Cited

U.S. PATENT DOCUMENTS

| | | | | | |
|---|---|---|---|---|---|
| 4,536,849 | A | * | 8/1985 | Borisch et al. ................ | 702/42 |
| 5,568,028 | A | * | 10/1996 | Uchiyama et al. ........... | 318/566 |
| 5,857,166 | A | * | 1/1999 | Kim ........................... | 702/179 |
| 5,936,369 | A | | 8/1999 | Iwashita et al. ............. | 318/609 |
| 6,129,609 | A | * | 10/2000 | Ripper et al. .................. | 451/8 |
| 6,384,560 | B1 | * | 5/2002 | Kakino et al. ............... | 318/566 |
| 6,615,103 | B2 | * | 9/2003 | Fujishima et al. ........... | 700/175 |
| 2002/0013639 | A1 | * | 1/2002 | Fujishima et al. ........... | 700/175 |
| 2004/0174130 | A1 | * | 9/2004 | Inoue et al. ................. | 318/569 |

FOREIGN PATENT DOCUMENTS

| | | | |
|---|---|---|---|
| EP | 1 166 960 A2 | | 1/2002 |
| EP | 1 342 534 A2 | | 9/2003 |
| EP | 1449615 A1 | * | 8/2004 |
| JP | 7-51991 | | 2/1995 |
| JP | 07-108443 A | * | 4/1995 |

* cited by examiner

Primary Examiner—Maria N. Von Buhr
(74) Attorney, Agent, or Firm—Staas & Halsey LLP (57) ABSTRACT A numerical control unit having a load monitoring function for monitoring a load on a tool drive source during a machining operation. The numerical control unit includes a load monitoring section for monitoring the load on an electric motor; a wear recognizing section for recognizing the current extent of tool wear; a storing section for storing a plurality of preset limit load values corresponding individually to predetermined various extents of tool wear; a calculating section for calculating the current limit load value corresponding to the current extent of tool wear recognized in the wear recognizing section, based on the plurality of preset limit load values stored in the storing section; and a comparing section for comparing the load on the electric motor, monitored in the load monitoring section, to the current limit load value calculated in the calculating section, and for judging on the abnormality of the load. The wear recognizing section recognizes the current extent of tool wear by using one parameter selected from a group consisting of the number of times of use of a tool, the duration of cutting by a tool, the distance of cutting by a tool and the number of times of execution of machining program. The load monitoring section monitors at least one of maximum value, average value and minimum value of the load in a certain procedure of a machining program.

7 Claims, 5 Drawing Sheets

Fig.2

NUMERICAL CONTROL UNIT

BACKGROUND OF THE INVENTION

1. Field of the Invention

The present invention relates generally to a numerical control unit for machine tools, and more particularly to a numerical control unit having a load monitoring function for monitoring a load on a tool drive source during a machining operation.

2. Description of the Related Art

In the field of machine tools, various methods have been proposed for detecting the cutting resistance acting on a tool during a machining operation, as a load applied to a spindle for turning the tool or a feed shaft for feeding the tool, and for controlling the operation of the spindle or feed shaft, depending on the magnitude of the load, so as to prevent tool breakage. In general, the cutting edge of a tool will become worn by successive use, and will finally become broken. In the case where the edge of a tool becomes worn, the load applied to a corresponding tool spindle or tool feed shaft will increase during cutting by this tool on a workpiece. Therefore, it is possible to prevent an unexpected tool breakage by monitoring the load on the drive source of the tool spindle or tool feed shaft, judging that tool breakage is liable to occur when the load rises above a predetermined reference value, and thus promptly taking measures such as halting the drive source.

For example, Japanese Unexamined Patent Publication (Kokai) No. 7-51991 (JP7-51991A) discloses a tool breakage preventing system in a numerically controlled machine tool, wherein the disturbance torque acting on at least one of a spindle for turning a tool and a feed shaft for feeding a tool is estimated, the estimated disturbance torque (or alternatively, a composite disturbance torque obtained by combining two estimated external torques of the spindle and feed shaft) is compared with a preset reference torque, and thus, based on the result of comparison, the feed speed of the tool is reduced, the tool feed is halted, or a tool exchange command is output. In one embodiment of this system, a two-stage measurement can be taken after the judgment on the comparison result, in that the estimated (or composite) disturbance torque is compared with two large and small preset reference torques (both being at an abnormal-load detectable level), and that, in the case where the estimated disturbance torque is in between these two reference torques, the feed speed of the tool feed shaft is reduced and, in the case where the estimated disturbance torque exceeds the larger reference torque, the tool feed is halted or the tool exchange command is output.

As disclosed in JP7-51991A, in the conventional method of monitoring a load torque to prevent tool breakage, the reference value, preset as a comparative value relative to a monitored load torque, is at an abnormal-load detectable level (e.g., the value corresponding to the load torque resulted from a tool, the extent of wear of which has reached a level just before tool breakage). Also, the above-described conventional method is constituted so as to monitor the load torque applied on the spindle or feed shaft for preventing tool breakage, and not to monitor the state of cutting of a workpiece by a tool. In this connection, the cutting resistance acting on a tool during cutting will sometimes temporarily increase at the instant when some type of abnormality occurs in the tool or machine tool. In such a case, cut-surface accuracy is liable to deteriorate locally in the area where the cutting resistance increases. However, if the increase in load on the spindle or feed shaft due to such a cutting abnormality does not reach the reference value preset for preventing tool breakage, it is difficult for the conventional method to detect such a cutting abnormality.

In general, tool wear proceeds gradually along with tool usage, and the cutting resistance acting on the tool increases along with progression in wear. In the state wherein a tool is new (i.e., the extent of wear is low), the cutting resistance is small, and thus the load acting on the spindle or feed shaft is also small. In this low wear state, the temporarily increased load acting on the spindle or feed shaft when a cutting abnormality occurs will seldom reach the reference value preset for preventing tool breakage, and therefore it is difficult for the conventional method to detect a cutting abnormality which locally reduces the machining accuracy. In other words, successive use of the tool results in the progression of wear and in a gradual increase in the cutting resistance acting on the tool, so that if a judgment criteria is fixed, it is difficult to judge between a normal cutting state and an abnormal cutting state by way of the magnitude of the load acting on the spindle or feed shaft.

SUMMARY OF THE INVENTION

It is therefore an object of the present invention to provide a numerical control unit having a load monitoring function capable of detecting a cutting abnormality.

To accomplish the above object, the present invention provides a numerical control unit for machine tools, comprising a load monitoring section for monitoring the load on an electric motor; a wear recognizing section for recognizing the current extent of tool wear; a storing section for storing a plurality of preset limit load values corresponding individually to various predetermined extents of tool wear; a calculating section for calculating the current limit load value corresponding to the current extent of tool wear recognized in the wear recognizing section, based on the plurality of preset limit load values stored in the storing section; and a comparing section for comparing the load on the electric motor, monitored in the load monitoring section, to the current limit load value calculated in the calculating section, and for judging on the abnormality of the load.

In the above numerical control unit, the wear recognizing section may recognize the current extent of tool wear by using one parameter selected from a group consisting of the number of times of use of a tool, the duration of cutting by a tool, the distance of cutting by a tool and the number of times of execution of a machining program.

Also, the load monitoring section may monitor at least one of maximum value, average value and minimum value of the load in a certain procedure of a machining program.

In this arrangement, each of the plurality of preset limit load values stored in the storing section may be a preset upper-limit value of the load, and the comparing section may compare the maximum value of the load, monitored in the load monitoring section, to the current limit load value calculated in the calculating section, based on a plurality of preset upper-limit values.

Also, each of the plurality of preset limit load values stored in the storing section may be a preset upper-limit average value of the load, and the comparing section may compare the average value of the load, monitored in the load monitoring section, to the current limit load value calculated in the calculating section, based on a plurality of preset upper-limit average values.

Further, each of the plurality of preset limit load values stored in the storing section may be a preset lower-limit average value of the load, and the comparing section may compare the average value of the load, monitored in the load monitoring section, to the current limit load value calculated in the calculating section, based on a plurality of preset lower-limit average values.

In addition, each of the plurality of preset limit load values stored in the storing section may be a preset lower-limit value of the load, and the comparing section may compare the minimum value of the load, monitored in the load monitoring section, to the current limit load value calculated in the calculating section, based on a plurality of preset lower-limit values.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

The embodiments of the present invention are described below in detail, with reference to the accompanying drawings. In the drawings, the same or similar components are denoted by common reference numerals.

Figure 1:
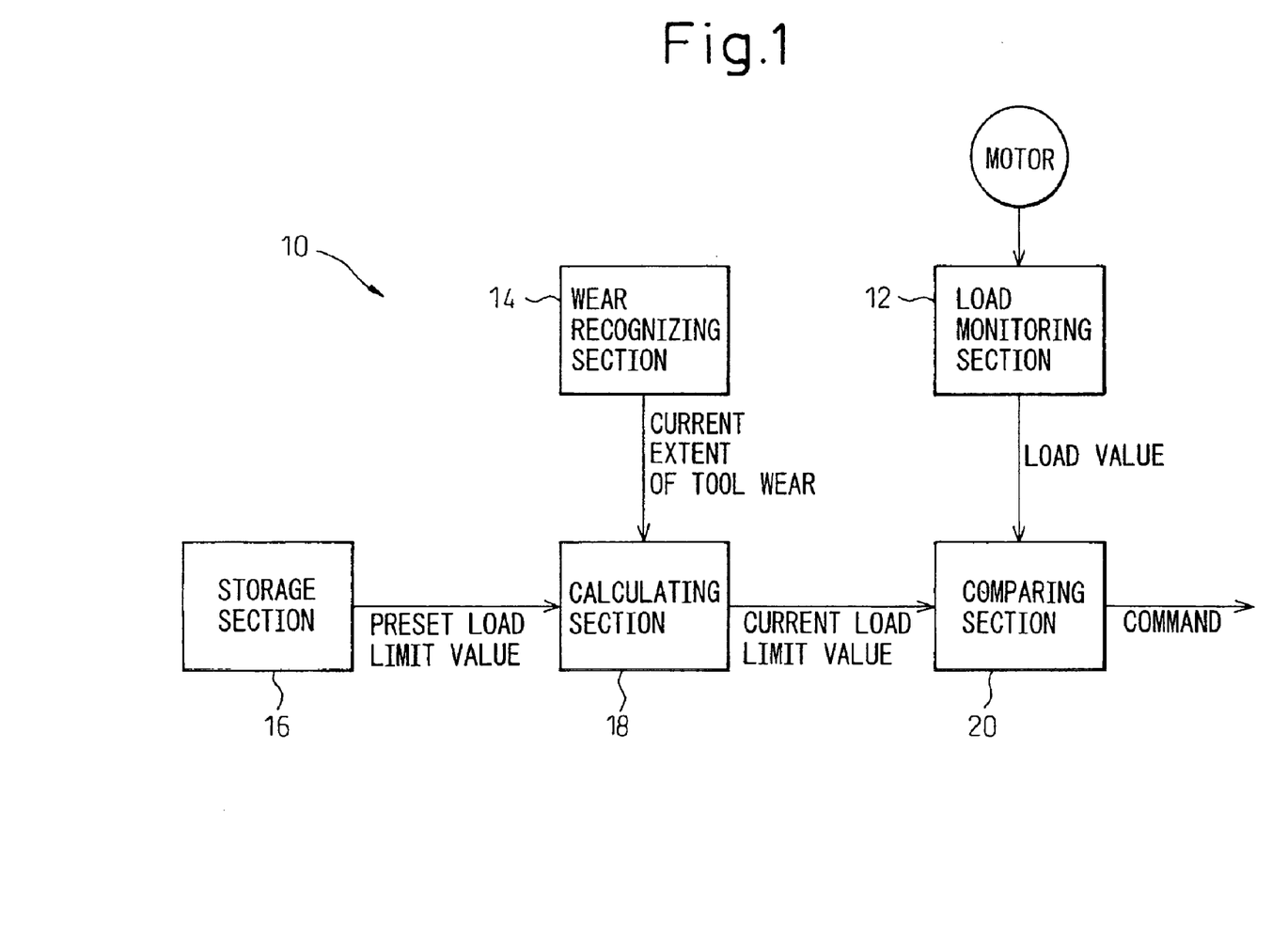
FIG. 1 is a block diagram showing a basic concept of a numerical control unit according to the present invention.

Referring to the drawings, FIG. 1 shows in a block diagram a basic concept of a numerical control unit according to the present invention. The numerical control unit 10 according to the present invention includes a load monitoring section 12 for monitoring the load on an electric motor; a wear recognizing section 14 for recognizing the current extent of tool wear; a storing section 16 for storing a plurality of preset limit load values corresponding individually to predetermined various extents of tool wear; a calculating section 18 for calculating the current limit load value corresponding to the current extent of tool wear recognized in the wear recognizing section 14, based on the plurality of preset limit load values stored in the storing section 16; and a comparing section 20 for comparing the load on the electric motor, monitored in the load monitoring section 12, to the current limit load value calculated in the calculating section 18, and for judging on the abnormality of the load.

Figure 2:
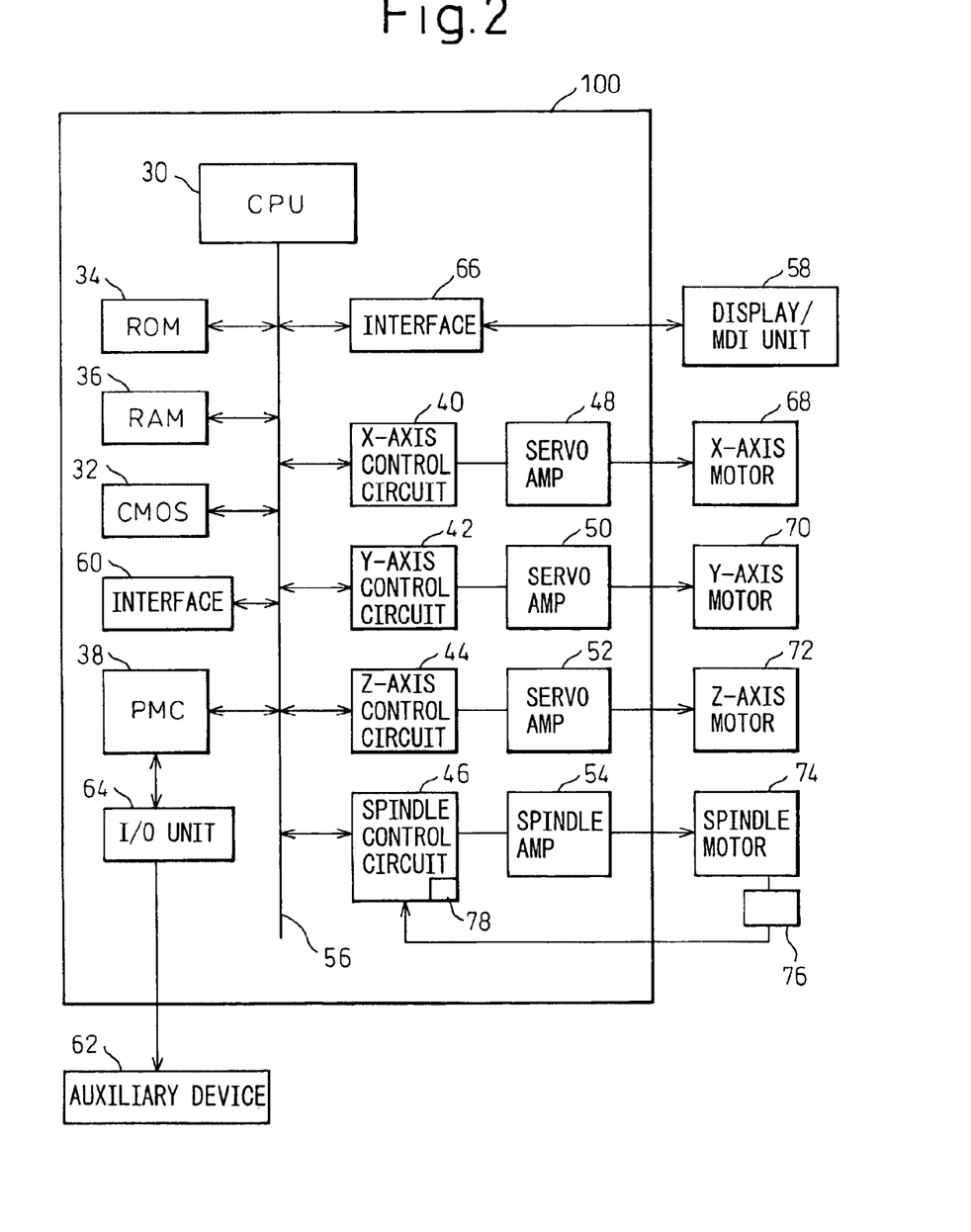
FIG. 2 is a block diagram showing a concrete configuration of hardware of a numerical control unit according to one embodiment of the present invention.

FIG. 2 shows the configuration of hardware of a numerical control unit 100 according to one embodiment of the present invention. The numerical control unit 100 includes a CPU (Central Processing Unit) 30 constituting the above-described wear recognizing section 14, calculating section 18 and comparing section 20, and a CMOS (Complementary Metal-Oxide Semiconductor) memory 32 constituting the above-described storing section 16. The numerical control unit 10 also includes, as the other basic components, a ROM (Read Only Memory) 34, a RAM (Random Access Memory) 36, a PMC (Programmable Machine Controller) 38, a plurality of control circuits 40, 42, 44, 46 and a plurality of amplifiers 48, 50, 52, 54.

The CPU 30 reads out a system program stored in the ROM 34 through a bus 56, and commands the numerical control unit 100 in its entirety in accordance with the system program. The RAM 36 stores temporary calculation data, display data and various data input by an operator through a display/MDI (Multiple Document Interface) unit 58. The CMOS memory 32 stores a machining program read in through an interface 60 and a machining program input through the display/MDI unit 58, as well as a load monitoring program for detecting a cutting abnormality, as explained later. The CMOS memory 32 is backed up by a not shown battery and is configured as a nonvolatile memory the storage state of which is maintained even when the power of the numerical control unit 100 is turned off. The interface 60 constitutes a connection with external apparatuses for inputting machining programs or various types of data.

The PMC 38 outputs signals through an I/O unit 64 to auxiliary devices 62 of the machine tool (e.g., actuators such as tool exchange robot hands) in accordance with a sequence program stored in the ROM 34, so as to control the auxiliary devices 62. Further, the PMC 38 receives signals of various switches in a control panel provided in the body of the machine tool (not shown), performs the necessary signal processing, and thereafter sends the signals to the CPU 30.

The display/MDI unit 58 is a manual data input device provided with a display comprised of a liquid crystal, CRT (Cathode Ray Tube), etc., and a keyboard, and is connected to the bus 56 through an interface 66. The X-axis, Y-axis and Z-axis control circuits 40, 42, 44 are comprised of processors, memories, etc., receive move commands for the respective axes from the CPU 30, and output travel signals for the respective axes to the corresponding servo amplifiers 48, 50, 52. The servo amplifiers 48, 50, 52 have the X-axis, Y-axis and Z-axis servo motors 68, 70, 72 operated on the basis of the move commands. The respective-axes servo motors 68, 70, 72 include not-shown position/speed detectors therein, and the respective-axes control circuits 40, 42, 44 perform a feedback control for position/speed, on the basis of position/speed feedback signals from the position/speed detectors.

In a similar way, the spindle control circuit 46 is also comprised of a processor, a memory, etc., receives spindle rotation commands from the CPU 30, and outputs spindle speed signals to the spindle amplifier 54. The spindle amplifier 54 has the spindle motor 74 operated at a designated speed of rotation, on the basis of the rotation commands. A position coder 76 is arranged in association with the spindle motor 74. The position coder 76 feeds back a feedback pulse to the spindle control circuit 46 in synchronization with the rotation of the spindle motor 74, whereby the spindle control circuit 60 performs a feedback control for rotation speed, on the basis of the feedback pulse.

The numerical control unit 100 according to one embodiment of the present invention is provided with a function of monitoring a load on the various motors to detect a cutting abnormality, in addition to the basic motion control for a machine tool as explained above. The cutting abnormality detecting function of the numerical control unit 100 will be described below.

The numerical control unit 100 of the illustrated embodiment includes a disturbance estimating observer 78 installed in the spindle control circuit 46. The disturbance estimating observer 78 is software for estimating the load torque acting on the spindle motor 74, and the applicable one is disclosed in, for example, U.S. Pat. No. 5,936,369 issued Aug. 10, 1999 to Iwashita et al., the teachings of which are hereby incorporated by reference. Accordingly, in the numerical control unit 100, the spindle control circuit 46 installing therein the disturbance estimating observer 78 constitutes the load monitoring section 12 as described above, and monitors the load on the spindle motor 74. The CPU 30 thus executes the process as described later, on the basis of the load torque estimated by the disturbance estimating observer 78, so as to detect a cutting abnormality.

On the other hand, the CPU 30 constituting the wear recognizing section 14 (FIG. 1) adopts, as parameters for recognizing the current extent of tool wear, the number of times of use, the duration of cutting, the distance of cutting, or the number of times of execution of a machining program, every one of which is associated with a tool. In the case where the duration and distance of cutting of a tool in a unit number of times of use (i.e., a single time use), defined as a period from its mounting on the spindle to its exchanging with another tool, is substantially unchanged, it is possible to adopt, as the parameter, the number of times of use of the tool (i.e., the number of times of mounting the tool onto the spindle by a tool exchange). In this case, it is possible to determine the extent of wear of the tool in one-to-one correspondence with the number of times of use of the tool, so that the CPU 30 can recognize the current extent of tool wear on the basis of the cumulative number of times of tool use. Further, in the case where identical machining programs are executed repeatedly by using a certain tool, it is possible to determine the extent of wear of the tool in one-to-one correspondence with the number of times of execution of the machining programs. In this case, the CPU 30 thus can recognize the current extent of tool wear by using the parameter as the number of times of execution of machining program of the tool. Moreover, each of the duration and distance of cutting by a tool is in one-to-one correspondence with the extent of wear of the tool, regardless of the contents of the machining program. Therefore, the CPU 30 can recognize the current extent of tool wear by using the parameter as the duration or distance of cutting by a tool.

The CMOS memory 32 constituting the storage section 16 (FIG. 1) is provided with a suitable tool file prepared therein. Then, prior to the execution of the cutting abnormality detecting process by the CPU 30, the current extent of tool wear is stored into the tool file in the CMOS memory 32 (i.e., written into an integrating register) through the display/MDI unit 58, by using the desired parameter selected from the above-described various parameters, in regard to each of various tools usable in the machine tool controlled by the numerical control unit 100. At the same time, as a plurality of preset limit load values corresponding individually to predetermined various extents of tool wear, the limit value of a maximum (i.e., a preset upper-limit value), the upper and lower limit values of an average (i.e., preset upper-limit and lower-limit average values) and the limit value of a minimum (i.e., a preset lower-limit value) of a load torque acting on the spindle motor 74, during a certain portion or procedure (e.g., a procedure of execution of cutting by the tool) in a machining program, are also stored, in regard to each of the various tools. In this connection, these preset limit load values are obtained through experimentation, by determining the maximum value, average value and minimum value of a load on the spindle motor 74 in the above-described certain procedure in correspondence individually with the predetermined various extents of tool wear (i.e., the number of times of use, the duration of cutting, the distance of cutting, or the number of times of execution of machining program), and by setting limitative values of these maximum, average and minimum values (i.e., reference values of judgment on a load abnormality on the electric motor), depending on the requirement of machining accuracy (such as dimensional accuracy, form accuracy, surface accuracy).

When the number of times of use of a tool is used as the parameter for recognizing the current extent of tool wear, the count of the integrating register for the current extent of tool wear is incremented by "1" each time the tool is mounted onto the spindle through tool exchange. Similarly, when the number of times of execution of machining program of a tool is used as the parameter for recognizing the current extent of tool wear, the count of the integrating register for the current extent of tool wear is incremented by "1" each time a machining program is executed, in regard to all tools used in the machining program. When the duration of cutting by a tool is used as the parameter for recognizing the current extent of tool wear, the measured duration of cutting is integrated and stored in the integrating register for the current extent of tool wear of the tool. Similarly, when the distance of cutting by a tool is used as the parameter for recognizing the current extent of tool wear, the measured distance of cutting is integrated and stored in the integrating register for the current extent of tool wear of the tool.

Figure 3:
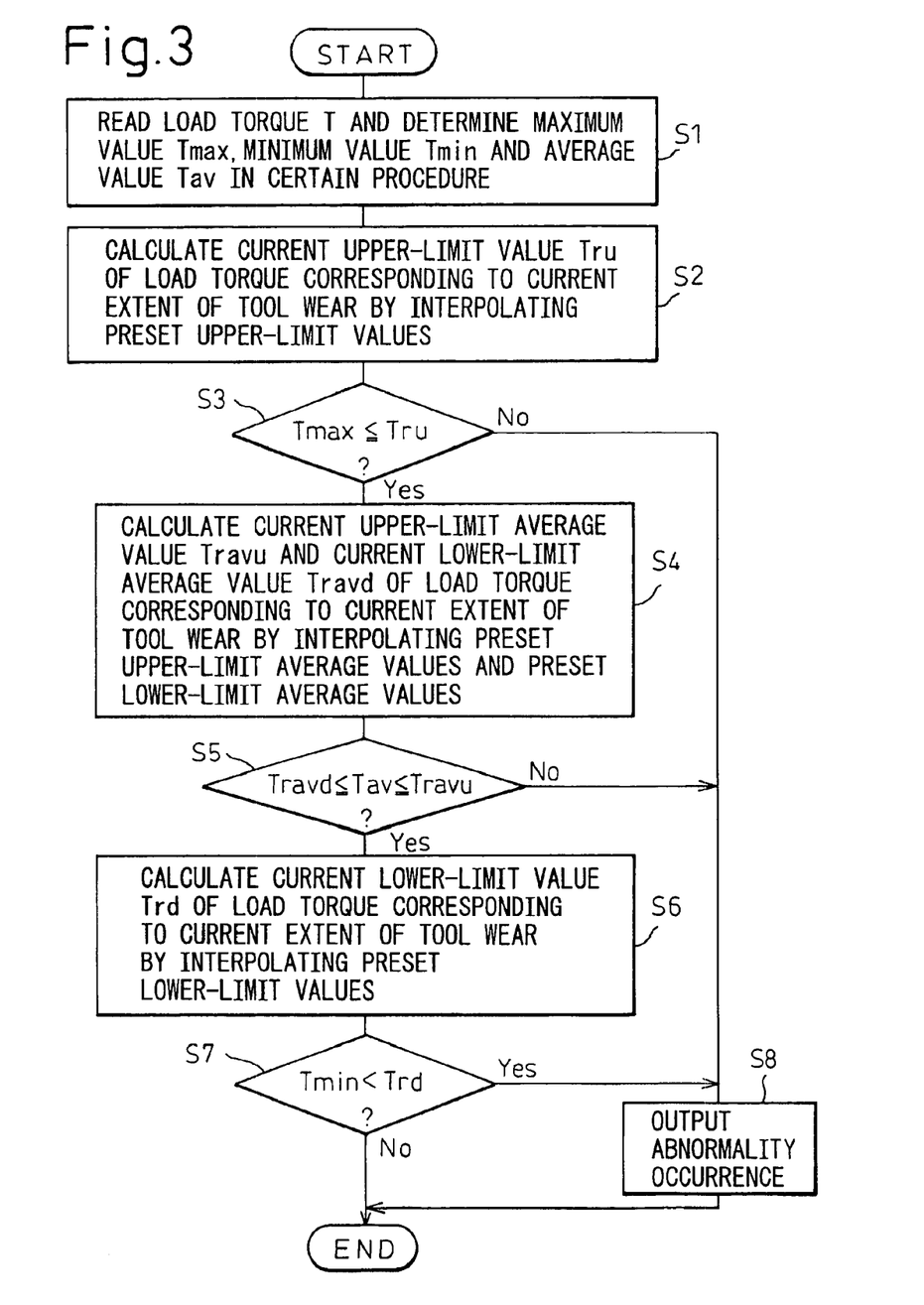
FIG. 3 is a flow chart showing a load monitoring processing routine performed in the numerical control unit of FIG. 2.

FIG. 3 is a flow chart of a load-torque monitoring and cutting-abnormality detecting process executed by the CPU 30 of the numerical control unit 100. The CPU 30 of the numerical control unit 100 executes the process shown in this flow chart repeatedly, during the execution of a cutting program, at such predetermined time intervals as to enable the instantaneous value of the load torque to be measured. It should be noted that the illustrated flow chart is provided for the above-described embodiment wherein the spindle motor 74 (FIG. 2) is monitored in relation to a load torque thereon so as to detect the cutting abnormality by detecting an abnormal load torque on a spindle, and thus the number of times of tool use is used as the parameter for recognizing the current extent of tool wear. Accordingly, as described above, at the time when a tool is mounted onto the spindle through tool exchange, the count of the integrating register for the current extent of tool wear (i.e., the number of times of use stored relative to the mounted tool), provided in the tool file in the CMOS memory 32, is incremented by "1", and the current extent of tool wear (i.e., the integrated value of the number of times of use) of the tool is renewed.

First, in step S1, a load torque T on the spindle 74, estimated by the disturbance estimating observer 78 (FIG. 2) installed in the spindle control circuit 46, is read from the disturbance estimating observer 78, during a certain portion or procedure (e.g., a procedure of execution of cutting by a tool) in a machining program. Then, the maximum value Tmax, average value Tav and minimum value Tmin of the load torque T read in the certain procedure are determined, for example, in the following way.

Specifically, a register S for summing up the read load torque T, a register C for counting the number of times of reading, a register Rmax for holding the maximum value Tmax and a register Rmin for holding the minimum value Tmin are prepared in advance. Each time the load torque T is read, the value of torque is added to the sum register S, and the count register C is incremented by "1". To the registers Rmax and Rmin, zero and the maximum value depending on a register size are given respectively as initial values, and each time the load torque T is read, the read torque value is compared with the numerical values of the registers Rmax and Rmin. If the read torque value is higher than the numerical value of Rmax, the numerical value of Rmax is replaced by the read torque value, while if the read torque value is legs than the numerical value of Rmin, the numerical value of Rmin is replaced by the read torque value. Consequently, at the time when the reading of the load torque T on the spindle motor 74 is completed in the certain procedure, the maximum value Tmax of the load torque T in this part is stored in the register Rmax and the minimum value Tmin is stored in the register Rmin. Also, the average value Tav of the load torque T is determined by dividing the sum of torque stored in the sum register S by the count number stored in the count register C (step S1).

Next, in step S2, the current extent of tool wear (or the current number of times of use) is read from the integrating register in the tool file, and two preset upper-limit values of load torque, corresponding respectively to the predetermined extents of tool wear (or the predetermined numbers of times of use) as being lower and higher than the read current extent of tool wear (or the current number of times of use) are read out from the tool file. Then, these preset upper-limit values are interpolated to calculate the current limit load value of maximum load torque (or a current upper-limit value) corresponding to the current extent of tool wear (or the current number of times of use). For example, if the current number of times of use is denoted by Mr, the predetermined number of times of use lower than and closest to the current number of times of use Mr is denoted by MA, the preset upper-limit value corresponding to the predetermined number of times of use MA is denoted by TAu, the predetermined number of times of use higher than and closest to the current number of times of use Mr is denoted by MB, and the preset upper-limit value corresponding to the predetermined number of times of use MB is denoted by TBu, the current upper-limit value Tru corresponding to the current number of times of use Mr is calculated by the following equation 1:

$$Tru = TAu + \{(Mr-MA) \cdot (TBu-TAu)/(MB-MA)\} \quad (1)$$

If the current extent of tool wear (the current number of times of use) in the integrating register is equal to anyone of the predetermined extents of tool wear (the predetermined numbers of times of use) (e.g., Mr=MA), the preset upper-limit value (e.g., TAu) corresponding to this predetermined number of times of use is adopted as the current upper-limit value (e.g., Tru), as will be understood from the equation 1.

Then, in step S3, the maximum value Tmax of the load torque determined in step S1 is compared with the current upper-limit value Tru calculated in step S2, so as to judge whether Tmax≦Tru. If the load torque maximum value Tmax exceeds the current upper-limit value Tru (i.e., Tmax>Tru), the routine proceeds to step S8, where an alarm indicating occurrence of a cutting abnormality is issued, and the load-torque monitoring and cutting-abnormality detecting process is completed.

On the other hand, if the load torque maximum value Tmax does not exceed the current upper-limit value Tru (i.e., the load torque maximum value Tmax is normal), the routine proceeds to step S4. In step S4, two preset upper-limit average values of load torque, corresponding respectively to the predetermined extents of tool wear (or the predetermined numbers of times of use) as being lower and higher than the current extent of tool wear (or the current number of times of use) are read out from the tool file. Then, these preset upper-limit average values are interpolated to calculate the current upper-limit load value of average load torque (or a current upper-limit average value) corresponding to the current extent of tool wear (or the current number of times of use). In the same manner, in step S4, two preset lower-limit average values of load torque are read out, and are interpolated to calculate the current lower-limit load value of average load torque (or a current lower-limit average value) corresponding to the current extent of tool wear (or the current number of times of use). For example, if the preset upper-limit average value corresponding to the predetermined number of times of use MA lower than and closest to the current number of times of use Mr is denoted by TAavu, the preset upper-limit average value corresponding to the predetermined number of times of use MB higher than and closest to the current number of times of use Mr is denoted by TBavu, the preset lower-limit average value corresponding to the predetermined number of times of use MA is denoted by TAavd, and the preset lower-limit average value corresponding to the predetermined number of times of use MB is denoted by Tbavd, the current upper-limit average value Travu and the current lower-limit average value Travd, corresponding to the current number of times of use Mr, are calculated by the following equations 2 and 3, respectively:

$$Travu = TAavu + \{(Mr-MA) \cdot (TBavu-TAavu)/(MB-MA)\} \quad (2)$$

$$TravD = TAavu + \{(Mr-MA) \cdot (TBavD-TAavu)/(MB-MA)\} \quad (3)$$

If the current extent of tool wear (the current number of times of use) in the integrating register is equal to anyone of the predetermined extents of tool wear (the predetermined numbers of times of use) (e.g., Mr=MA), the preset upper-limit average value (e.g., TAavu) and the preset lower-limit average value (e.g., TAavd), corresponding to this predetermined number of times of use, are adopted as the current upper-limit average value (e.g., Travu) and the current lower-limit average value (e.g., Travd), respectively, as will be understood from the equations 2 and 3.

Then, in step S5, the average value Tav of the load torque determined in step S1 is compared with the current upper-limit average value Travu and current lower-limit average value Travd calculated in step S4, so as to judge whether Travd≦Tav≦Travu. If the load torque average value Tav is not in the range between the current upper-limit average value Travu and the current lower-limit average value Travd (i.e., Tav>Travu or Tav<Travd), the routine proceeds to step S8, where an alarm indicating occurrence of a cutting abnormality is issued, and the load-torque monitoring and cutting-abnormality detecting process is completed.

On the other hand, if the load torque average value Tav does not exceed the current upper-limit average value Travu and is not lower than the current lower-limit average value Travd (i.e., the load torque average value Tav is normal), the routine proceeds to step S6. In step S6, two preset lower-limit values of load torque, corresponding respectively to the predetermined extents of tool wear (or the predetermined numbers of times of use) as being lower and higher than the current extent of tool wear (or the current number of times of use) are read out from the tool file. Then, these preset lower-limit average values are interpolated to calculate the current limit load value of minimum load torque (or a current lower-limit value) corresponding to the current extent of tool wear (or the current number of times of use). For example, if the preset lower-limit value corresponding to the predetermined number of times of use MA lower than and closest to the current number of times of use Mr is denoted by TAd, and the preset lower-limit value corresponding to the predetermined number of times of use MB higher than and closest to the current number of times of use Mr is denoted by TBd, the current lower limit value Trd corresponding to the current number of times of use Mr is calculated by the following equation 4:

$$Trd=TAd+\{(Mr-MA)\cdot(TBd-TAd)/(MB-MA)\} \quad (4)$$

If the current extent of tool wear (the current number of times of use) in the integrating register is equal to anyone of the predetermined extents of tool wear (the predetermined numbers of times of use) (e.g., Mr=MA), the preset lower-limit value (e.g., TAd) corresponding to this predetermined number of times of use is adopted as the current lower-limit value (e.g., Trd), as will be understood from the equation 4.

Then, in step S7, the minimum value Tmin of the load torque determined in step S1 is compared with the current lower-limit value Trd calculated in step S6, so as to judge whether Tmin<Trd. If the load torque minimum value Tmin is lower than the current lower-limit value Trd (i.e., Tmin<Trd), the routine proceeds to step 58, where an alarm indicating occurrence of a cutting abnormality is issued, and the load-torque monitoring and cutting-abnormality detecting process is finished. On the other hand, if the load torque minimum value Tmin is not lower than the current lower-limit value Trd (i.e., the load torque minimum value Tmin is normal), it is concluded that no cutting abnormality is occurred in this certain procedure, and the load-torque monitoring and cutting-abnormality detecting process is completed.

As described above, in the numerical control unit 100, the current upper-limit value, the current upper-limit average value, the current lower-limit average value and the current lower-limit value of load torque, corresponding to the current extent of tool wear, are calculated in a certain portion or procedure in a machining program, by interpolation with respect to the preset upper-limit values, the preset upper-limit average values, the preset lower-limit average values and the preset lower-limit values of load torque, respectively, which are preset discretely in correspondence with the various extents of tool wear. Thereafter, it is judged whether the maximum value, the average value and the minimum value of the load torque determined on the basis of the estimated values of the disturbance estimating observer 78 are allowable in view of the comparison with the current upper-limit value, the current upper-limit/lower-limit average values and the current lower-limit value, respectively, and if not, it is concluded that a cutting abnormality has occurred, and the alarm is output.

Figure 4:
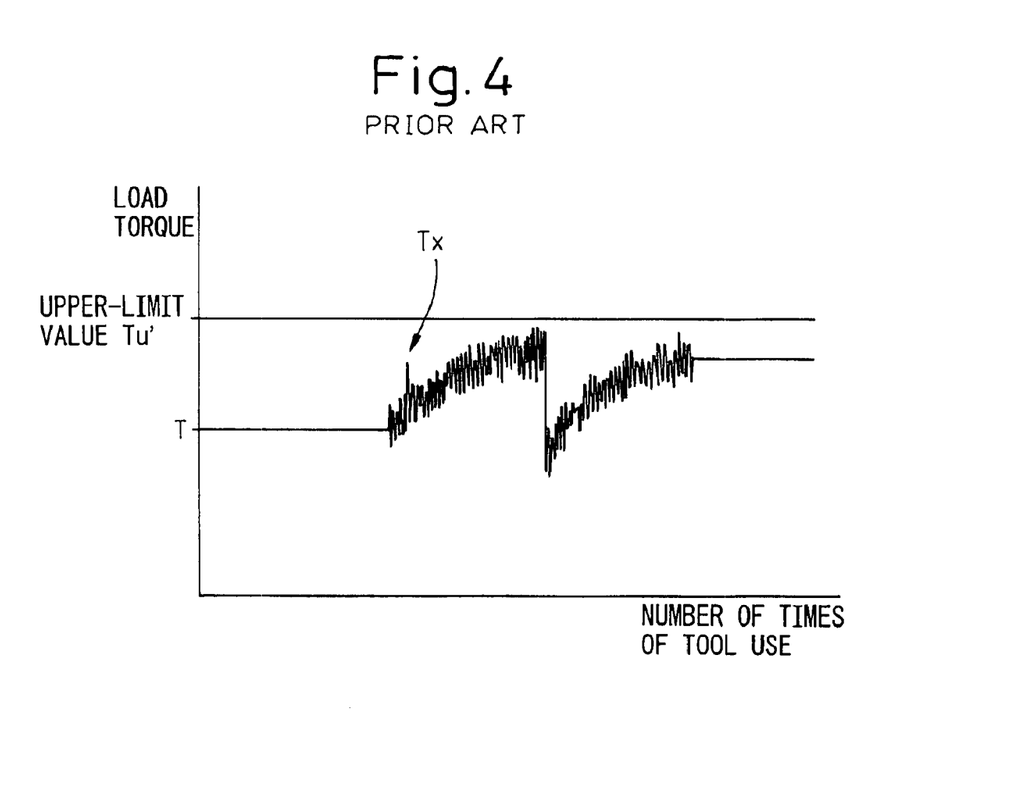
FIG. 4 is an illustration showing the relationship between a limit load value and a load curve in a controlled electric motor, in the conventional method for preventing tool breakage.
Figure 5:
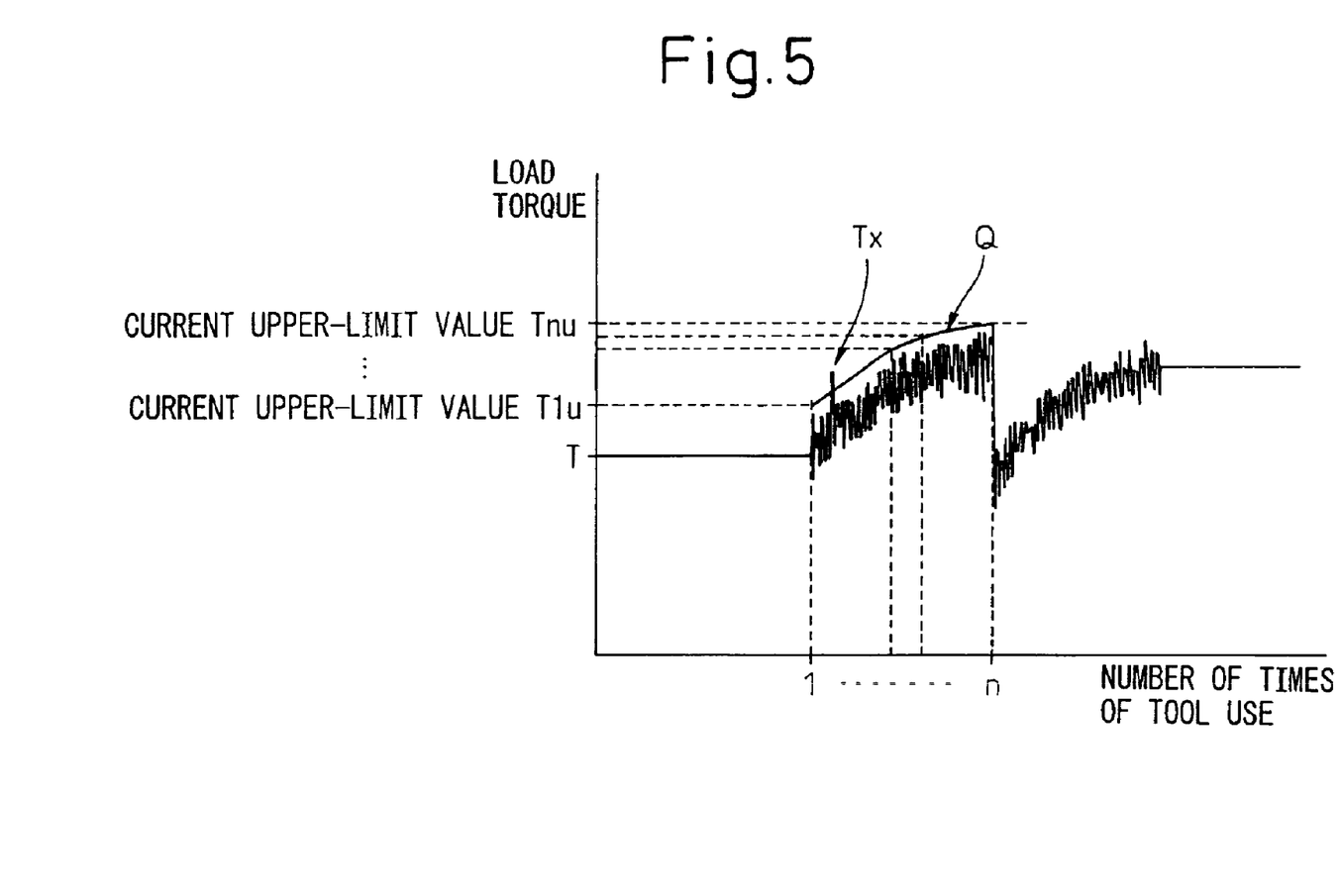
FIG. 5 is an illustration showing the relationship between a current limit load value and a load curve in a controlled electric motor, in the numerical control unit according to the present invention.

FIGS. 4 and 5 show, by way of example, the relationship between a limit load value (an upper-limit value Tu') and a load curve in a controlled electric motor (a spindle motor) in the conventional method for preventing tool breakage, and the relationship between the current limit load value (the current upper-limit value Tru) and the load curve in a controlled electric motor (a spindle motor) in the numerical control unit 100 according to the present invention, respectively. As illustrated in FIG. 4, in the conventional method, the upper-limit value Tu' as a reference value of judgment on the occurrence of tool breakage is constant (in an abnormal-load detectable level), and with regard to one tool, the tool is changed with a new one at the instant when the load torque on the spindle motor reaches the upper-limit value Tu' following the gradual increase thereof according to the increment in the number of times of tool use (the extent of tool wear). Contrary to this, in the load-torque monitoring and cutting-abnormality detecting process of the numerical control unit 100 as illustrated in FIG. 5, the current upper-limit values Tlu to Tnu individually corresponding to the current numbers of times of tool use (the extents of tool wear) 1 to n are determined, so that the current upper-limit value Tru as a reference value of judgment on the occurrence of cutting abnormality is varied, depending on the extents of tool wear, as shown by the curve Q. Then, with regard to one tool, the tool is changed with a new one the instant the load torque on the spindle motor reaches the maximum Tnu of the current upper-limit values following on the gradual increase thereof, according to the increment in the number of times of tool use.

In this context, the case will be looked at wherein a load torque Tx, which is abnormally large for the maximum load in a certain procedure, is detected under the condition where the number of times of tool use is relatively low, during machining operations repeatedly performed by one tool. This kind of abnormal load may result in a local deterioration of machining accuracy. In this case, in the conventional method shown in FIG. 4, the abnormal load torque Tx is usually lower than the upper-limit value Tu', so that the abnormal load is not detectable and the machining thus continues on the assumption that the cutting is proceeding normally.

In contrast to this, in the process of the numerical control unit 100 shown in FIG. 5, the abnormal load torque Tx usually exceeds the current upper-limit value Tru (in the curve Q) corresponding to the number of times of tool use at the instant of occurrence of the abnormal load torque Tx, so that the alarm indicating occurrence of an abnormality is issued and it is thus possible to immediately take countermeasures such as the halting of machining. Further, although not shown in FIG. 5, in the numerical control unit 100, the current upper-limit/lower-limit average values and the current lower-limit value, varied depending on the extent of tool wear, are determined as reference values of judgment on the occurrence of cutting abnormality, with regard to the average value and the minimum value in the certain procedure. Therefore, in the case where a load torque, which is abnormally high for the average load in the certain procedure, is detected under the condition where the number of times of tool use is relatively low, such an abnormal load torque usually exceeds the current upper-limit average value corresponding to the number of times of tool use at the instant of occurrence of the abnormal load torque, so that it is possible to activate an alarm indicating the occurrence of an abnormality, i.e., deterioration of machining accuracy. On the other hand, in the case where a load torque, which is abnormally low for the average or minimum load in the certain procedure, is detected, such an abnormal load torque is usually less than the current lower-limit average value or the current lower-limit value, corresponding to the number of times of tool use at the instant of occurrence of the abnormal load torque, with the result that it is also possible to issue an alarm indicating the occurrence of an abnormality. This kind of abnormally low load torque indicates that the cutting edge of a tool is broken at the instant of occurrence of an abnormal load torque, so that it is possible to halt the machining and to replace the tool with a new one.

As will be understood from the above, according to the present invention, it is possible, even in an initial stage in which the extent of tool wear is relatively low, to detect a cutting abnormality, which may result in deterioration of machining accuracy, and to take countermeasures such that, for example, an operator observes the subsequent tool condition so that machining can be performed continuously if he judges that successive machining is possible, or alternatively, the tool is immediately changed if he judges that successive machining is impossible. As a result, a workpiece with deteriorated machining accuracy is prevented from being produced, and thereby the yield of the workpiece is improved. Further, according to the present invention, it is possible to detect a cutting abnormality indicating tool breakage regardless of the extent of tool wear, so that it is also possible to avoid such a disadvantage that successive machining by a broken tool might result equipment damage.

In the above embodiment, the maximum value, average value and minimum value of load torque in the certain procedure are all monitored so as to detect an abnormal load or cutting abnormality. However, the present invention may be constituted such that, in place of the above constitution, one or two desired values selected from the maximum, average and minimum values of load torque in the certain procedure are monitored so as to detect the cutting abnormality. Also, in the case where the average load torque in the certain procedure is monitored, either one of the current upper-limit average value and the current lower-limit average value can be used as the reference of judgment on the cutting abnormality.

Further, in the above embodiment, the spindle control circuit 46 for controlling the spindle motor 74 is provided with the disturbance estimating observer 78, and the disturbance estimating observer 78 is used to monitor the load acting on the spindle motor 74. However, the present invention may be constituted such that, in place of the provision of the disturbance estimating observer 78, the load torque acting on the spindle motor is directly measured by monitoring a drive current flowing through the spindle motor or by additionally mounting a torque sensor for the exclusive use of measuring.

Moreover, in the above embodiment, a cutting abnormality is detected by monitoring the load torque acting on the spindle motor 74. On the other hand, the present invention may be constituted such that, in place of this, a cutting abnormality is detected by monitoring the load torques acting on the servo motors 68, 70, 72 for the X-axis, Y-axis and Z-axis as the tool feed shafts. With this arrangement, disturbance estimating observers are installed respectively in the axis control circuits 40, 42, 44 operationally controlling the X-axis, Y-axis and Z-axis servo motors 68, 70, 72, and the disturbance estimating observers are used to monitor the load torques acting on the respective servo motors. Alternatively, as explained above, the load torques acting on the respective motors may be directly measured by monitoring drive currents flowing through the motors or by additionally mounting torque sensors for the exclusive use of measuring.

In the case where the load torques acting on the X-axis, Y-axis and Z-axis servo motors 68, 70, 72 are monitored, a composite load torque obtained by combining the load torques acting on the respective servo motors may also be used for the judgment on the cutting abnormality. With this arrangement, it is possible to execute a process substantially identical to the process flow as shown in FIG. 3, except that the load torque on the spindle motor read in step S1 is changed to the composite load torque and the preset limit load values in the tool file are slightly varied. Alternatively, if it is required to simplify the cutting abnormality detecting process, the maximum load torque among the load torques acting on the X-axis, Y-axis and Z-axis servo motors 68, 70, 72 may be used instead of the load torque on the spindle motor read in step S1 in FIG. 3.

Further, instead of monitoring the load torques on all tool feed shafts, the load torque on the desired one or two tool feed shafts may be monitored, depending on the contents of machining programs. More specifically, in a machining with a tool being fed in the longitudinal direction thereof, such as drilling or tapping, it is sufficient to monitor only the load torque on the z-axis. While in a machining with a tool being fed in a direction intersecting the longitudinal axis thereof, such as end or peripheral surface cutting by an endmill, it is advantageous to monitor the load torques on the x-axis and y-axis.

While the invention has been described with reference to specific preferred embodiments, it will be understood by those skilled in the art that various changes and modifications may be made thereto without departing from the spirit and scope of the following claims.

What is claimed is:

1. A numerical control unit for machine tools, comprising:
  a load monitoring section for monitoring a load on an electric motor;
  a wear recognizing section for recognizing a current extent of tool wear;
  a storing section for storing a plurality of preset limit load values corresponding individually to predetermined various extents of tool wear;
  a calculating section for calculating a current limit load value corresponding to said current extent of tool wear recognized in said wear recognizing section, based on said plurality of preset limit load values stored in said storing section; and
  a comparing section for comparing the load on the electric motor, monitored in said load monitoring section, to said current limit load value calculated in said calculating section, and for judging on an abnormality of said load.

2. A numerical control unit as set forth in claim 1, wherein said wear recognizing section recognizes said current extent of tool wear by using one parameter selected from a group consisting of a number of times of use of a tool, a duration of cutting by a tool, a distance of cutting by a tool and a number of times of execution of machining program.

3. A numerical control unit as set forth in claim 1, wherein said load monitoring section monitors at least one of maximum value, average value and minimum value of said load in a certain procedure of a machining program.

4. A numerical control unit as set forth in claim 3, wherein each of said plurality of preset limit load values stored in said storing section is a preset upper-limit value of said load, and wherein said comparing section compares said maximum value of said load, monitored in said load monitoring section, to said current limit load value calculated in said calculating section based on a plurality of preset upper-limit values.

5. A numerical control unit as set forth in claim 3, wherein each of said plurality of preset limit load values stored in said storing section is a preset upper-limit average value of said load, and wherein said comparing section compares said average value of said load, monitored in said load monitoring section, to said current limit load value calculated in said calculating section based on a plurality of preset upper-limit average values.

6. A numerical control unit as set forth in claim 3, wherein each of said plurality of preset limit load values stored in said storing section is a preset lower-limit average value of said load, and wherein said comparing section compares said average value of said load, monitored in said load monitoring section, to said current limit load value calculated in said calculating section based on a plurality of preset lower-limit average values.

7. A numerical control unit as set forth in claim 3, wherein each of said plurality of preset limit load values stored in said storing section is a preset lower-limit value of said load, and wherein said comparing section compares said minimum value of said load, monitored in said load monitoring section, to said current limit load value calculated in said calculating section based on a plurality of preset lower-limit values.

* * * * *